Sept. 6, 1927.  W. G. JOHNSON  1,641,225
BUMPER
Filed April 8, 1927
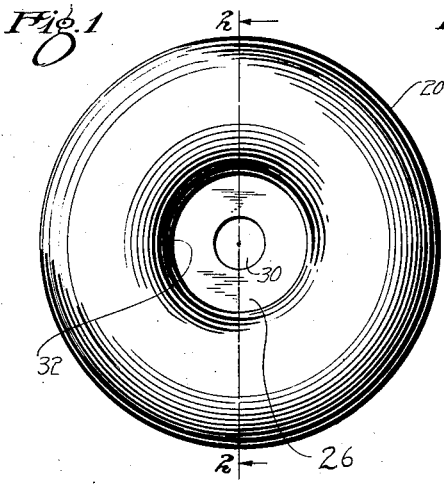
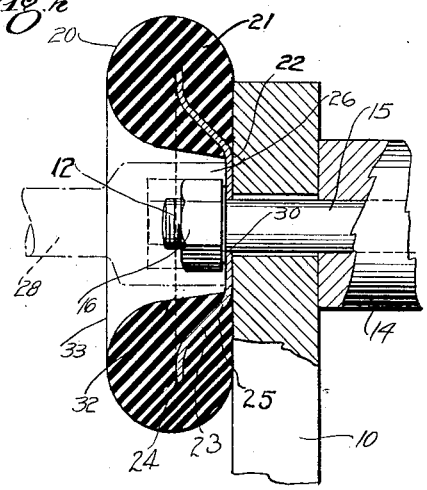
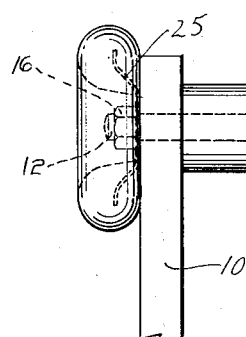
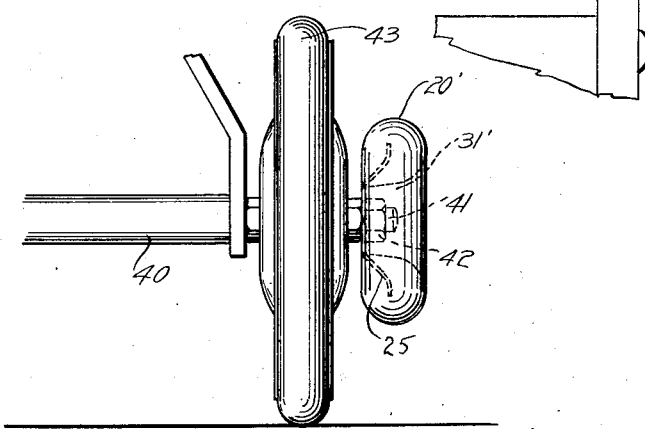
Inventor
Wilfred G. Johnson
By Frank M. Slough
Attorney Patented Sept. 6, 1927.

1,641,225

UNITED STATES PATENT OFFICE.

WILFRED G. JOHNSON, OF ELYRIA, OHIO.

BUMPER.

Application filed April 3, 1927. Serial No. 181,991.

My invention relates to bumpers and more particularly it relates to a bumper for guarding the projecting portions of supporting members.

One of the objects of my invention resides in the provision of an improved bumper adapted to guard a projecting metallic portion of a portable wheeled vehicle to protect extraneous objects from injury by virtue of being struck by the projecting portions.

Another object of my invention resides in the provision of an improved bumper which may be readily applied to the projecting portions of a wheeled vehicle and which may be readily removed therefrom if desired.

Another object of my invention resides in the provision of a bumper which is durable in construction, economical to manufacture and efficient in protecting extraneous objects from injury.

These and other objects of my invention and the invention itself will become apparent from reference to the following description of an embodiment thereof and in which description reference will be had to the accompanying drawings forming a part of this specification.

Referring to the drawings:

Fig. 1 shows a front elevational view of an embodiment of my invention;

Fig. 2 shows a transverse medial sectional view taken on the line 2—2 of Fig. 1 and illustrating the same mounted on a support;

Fig. 3 shows a fragmentary elevational view of a portable wheel truck handle bar embodying my invention; and Fig. 4 shows a fragmentary end elevational view of a vehicle wheel and axle embodying my invention.

Referring to the drawings and referring first particularly to Figs. 1, 2 and 3 thereof, whrein like parts are designated by like reference characters, at 10 and 11, I show a pair of upright handle part supporting arms having aligned apertures adjacent their uppermost ends through which project the threaded ends 12 and 13 of the rod 15, the rod supporting the wooden handle bar 14 between the arms. Nuts 16 and 17 are threaded onto the rod ends and project laterally of the upright arms 10 and 11. Such a structure is quite commonly employed in connection with platform trucks, and the like, and often such a handle and handle support is duplicated at each end of the truck platform. The ends of the arms and the projecting nuts when trucks employing handle constructions, as described, are used, strike against extraneous objects, such as furniture, walls, door jams, and the like, considerably damaging same.

By virtue of my invention, protection of extraneous objects from such damage is had by employing a bumper of improved design, disposed so as to guard projecting parts of the truck. Such a bumper I show generally at 20, the major portion of which preferably comprises an annulus, or toroid 21, of soft pliable rubber or like material capable of absorbing shocks, without damage, a cup-shaped metallic reenforcing insert or plate 25 being embedded therein and secured thereto by vulcanization of the rubber material while in contact therewith.

The cup-shaped metallic insert is preferably made, as shown, with a flat bottom wall 22 and an outwardly flaring rim 24 joined by intermediate inclined side walls 23. The cup-shaped plate 25 is apertured centralled so as to permit a threaded end 12 of a bolt, rod or shaft 15, to project therethrough, whereby the bumper comprising the plate and rubber toroid may be bolted to the vehicle or other structure which it is adapted to guard from contact with extraneous objects, a nut 16, shown in Fig. 2, a nut 17, in Fig. 3, and a nut 42, in Fig. 4, being screw-threaded onto the end of such a rod or shaft for such purpose. The threaded end of the rod, bolt, or shaft, and the nut are therefore contained within a substantially cup-shaped recess having toroidal resilient side walls 20 and below the rim of such a so-called cup, as indicated at 33, which is the outer face of the toroid. The central opening of the toroid containing the securing nut, such as 16, Fig. 2, is of such a size as to permit a socket wrench, indicated at 28, to enter the toroid to engage the nut for tightening the same on the rod 15 or to remove the same from the rod. The aperture 30 in the metallic plate is preferably of a diameter less than the diameter of the ring aperture 26. A central recess 26 in the soft rubber annulus or toroid 21 is preferably provided with tapering side walls 32 and is of a sufficient depth to project beyond the nut and the end of the bolt or rod supporting it. The diameter of the central recess of the annulus is preferably substantially equal to the transverse cross-sectional dimensions of the body of the annulus, as I find that by so proportioning the annulus, I obtain, for most purposes, very satisfactory results.

In applying my improved bumper to the handle bar such as that shown at 14, the nut 16 is removed from the rod 15 and the bumper is placed on the rod with the rod projecting into the aperture 30 in the metallic plate 25 with its threaded portion 12 disposed in the recess 26. The nut 16 is then threaded onto the rod again and tightened thereon by means of the socket wrench 28. The peripheral edge of the annulus will project beyond the ends of the handle bar supporting uprights 10 and 11 and prevent contact thereof with extraneous objects while the nut 16 is substantially enveloped by the bumper.

Referring to Fig. 4 of the drawings, I illustrate another application of my invention applied to an axle 40 of a wheel vehicle with the threaded end 41 of the axle projecting into the central recess 31' of the bumper 20' and a hub nut 42 threaded onto the axle and disposed within the said central recess 31' laterally of a wheel 43.

I have illustrated an embodiment of my invention in but two applications of use; however, I do not wish to be limited to the specific applications thereof as herein illustrated and described, as I contemplate embodying my improved bumper on numerous projecting portions of numerous movable and stationary objects to prevent damaging contact of such projecting portions with extraneous objects.

A bumper construction as heretofore described possesses sufficient rigidity to prevent the same from becoming worn or loose on the supporting article and possesses sufficient resiliency to absorb shocks resulting from contact with extraneous objects without injury to the supporting part or the object with which it comes in contact. The bumper besides possessing durability is economical to manufacture in large quantities, and may either be applied to a portable or stationary object as a part thereof or may be purchased as an accessory and applied to the same.

Many times when a bumper is applied to a portable article, the nut may be turned by hand to contact with the metallic insert or plate 25 and then by rotating the bumper the nut may be sufficiently tightened on the rod without the aid of a wrench. This is highly desirable wherein an article is equipped with nuts of a non-standard size.

Having thus described my invention in a specific embodiment, I am aware that numerous and extensive departures may be made from the embodiment herein illustrated and disclosed, without departing from the spirit of my invention.

I claim:

1. As an article of manufacture, a bumper for projecting portions of wheeled vehicles, comprising a body of soft rubber or rubber composition material and a centrally apertured metallic plate having a flat portion disposed flush with, and vulcanized to, a side of the body.

2. As an article of manufacture, a bumper adapted for attachment to the ends of push handles for vehicles, the axle ends thereof, and the like, comprising an annulus composed mainly of soft rubber material, a centrally apertured, substantially rigid, metallic plate disposed with at least a portion of its outer face flush with a side of the annulus, the inside diameter of the annulus being substantially equal to the thickness thereof.

3. As an article of manufacture, a bumper adapted for attachment to the ends of push handles for vehicles, the axle ends thereof, and the like, comprising a toroid composed mainly of soft rubber material, of a metallic cup-shaped plate disposed within the material of the toroid of smaller diameter than the outside diameter of the toroid and having side walls of greater diameter than the bore thereof, said plate being centrally apertured to receive a threaded end of a bolt, and the bore of the toroid being sufficiently large to admit a nut to be affixed on the end of the bolt projecting through the plate, and the end of a socket wrench for tightening the bolt.

4. As an article of manufacture, a bumper for projecting portions of wheeled vehicles, comprising an annulus of soft rubber material and a centrally apertured metallic cup with diverging sides projecting into the annulus.

5. As an article of manufacture, a bumper adapted for attachment to the ends of push handles for vehicles, the axle ends thereof, and the like, comprising an annulus composed of soft rubber material, and a centrally apertured substantially rigid metallic cup with diverging sides projecting into the annulus, said annulus and said metallic cup being cementitiously bonded together.

6. As an article of manufacture, a bumper, a support for the bumper, said bumper comprising a body of rubber or rubber composition material, a centrally apertured metallic plate imbedded within the body adjacent its supporting face, said body being recessed from the other side of the plate, said recess aligned with said aperture, said body being formed with rounded lateral surfaces adapted to fend extraneous articles coming in contact therewith, from the support.

7. As an article of manufacture, a bumper, for projecting portions of wheeled vehicles comprising a body of soft rubber or rubber composition material, a centrally apertured metallic plate imbedded in the body adjacent its supporting surface, said body being centrally recessed from the other side of the plate and having rounded lateral surfaces adapted to fend extraneous articles coming in contact therewith, from the vehicle.

In testimony whereof I hereunto affix my signature this 25th day of March, 1927.

WILFRED G. JOHNSON